No. 11,994. Reissued May 27, 1902.

J. M. ANDREWS.

PNEUMATIC STRAW STACKER.

(Application filed Feb. 7, 1902.)

2 Sheets—Sheet 1.

Witnesses
Frank R. A. Fahle
Guy Monston

Inventor
John M. Andrews
By
Arthur M. Hood
Attorney

No. 11,994. Reissued May 27, 1902.

J. M. ANDREWS.

PNEUMATIC STRAW STACKER.

(Application filed Feb. 7, 1902.)

2 Sheets—Sheet 2.

Witnesses

Frank A. Fahle

Guy Moreston

Inventor

John M. Andrews

By

Arthur M. Hood

Attorney

UNITED STATES PATENT OFFICE.

JOHN M. ANDREWS, OF ANDREWS, TENNESSEE, ASSIGNOR OF TWO-FIFTHS TO A. P. ROBERTS AND C. P. ROBERTS.

PNEUMATIC STRAW-STACKER.

SPECIFICATION forming part of Reissued Letters Patent No. 11,994, dated May 27, 1902.

Original No. 669,500, dated March 12, 1901. Application for reissue filed February 7, 1902. Serial No. 93,092.

*To all whom it may concern:*

Be it known that I, JOHN M. ANDREWS, a citizen of the United States, residing at Andrews, in the county of Maury, State of Tennessee, have invented a new and useful Pneumatic Straw-Stacker, of which the following is a specification.

My invention relates to an improvement in the means for driving and automatically swinging the stacker-tube of a pneumatic stacker. In stackers of this class the discharge-tube consists in part of a vertical inner end, which is carried by a revolving table or "master-gear," and this gear or table has been heretofore driven by a positive gear connection, such as a worm and worm-wheel or spur-gears. In either case the bearing or support for the revolving table or master-gear is in practice such that after continued operation it is not as accurate as at the beginning, and the table has a possibility of distortion from its original plane of movement owing to the overbalancing weight of the discharge end of the stacker-tube. As a consequence the distortion of the revolving table from its intended plane of operation results in a pinching or grinding action between the gear of the table and the worm or spur gear by which it may be driven. In the use of stackers of this type an arc-shaped stack is formed; but difficulty is experienced in keeping the ends of the stack up to the height of the middle.

The object of my invention, therefore, is to provide a driving connection for the revolving table or master-wheel of such character that it may yield in the direction of possible distortion of said table from its plane of operation, so that there can be no tendency to pinch or bind in the driving connection.

Further objects of my invention are to provide means by which the stacker-tube may be caused to dwell at each end or reversal of its movement and to provide such improvements in details of construction as shall be hereinafter pointed out.

The accompanying drawings illustrate my invention.

Figure 1:
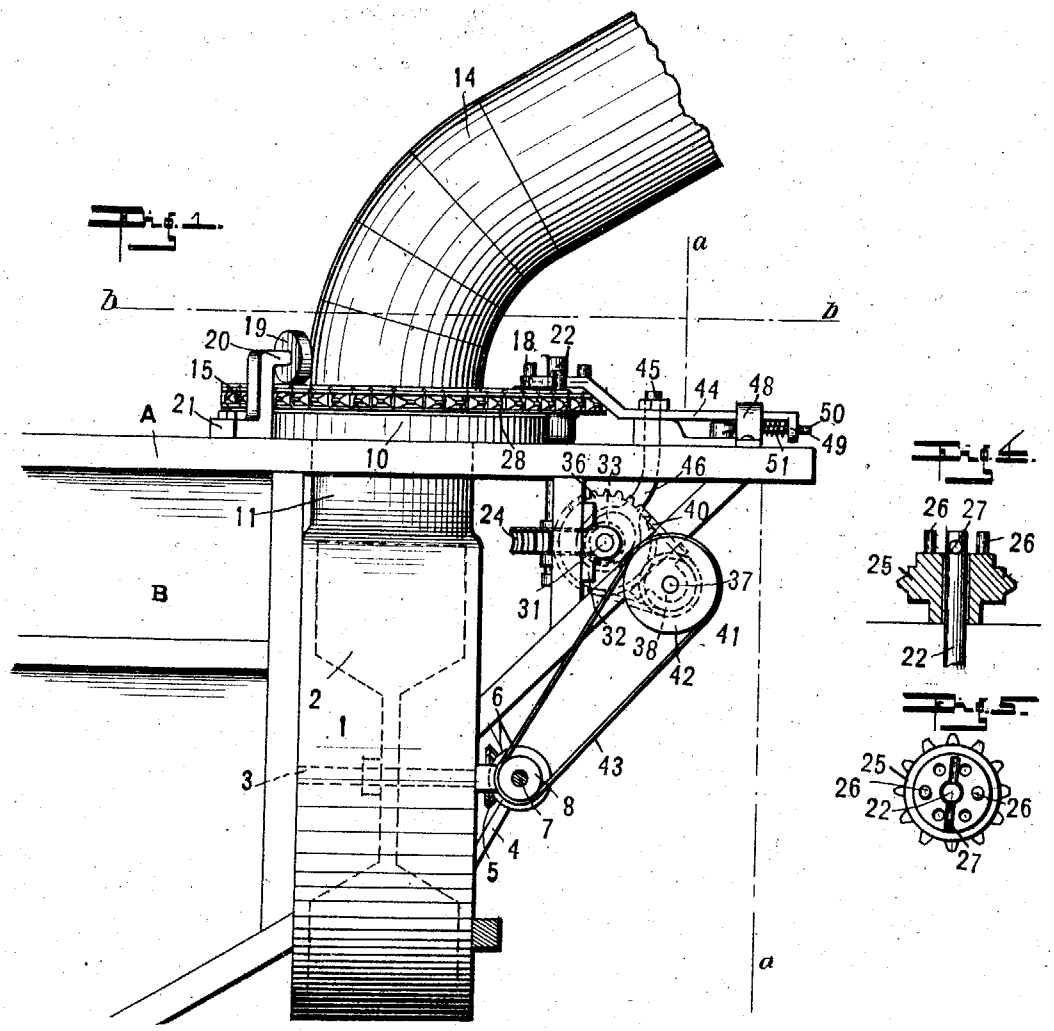
Figure 2:
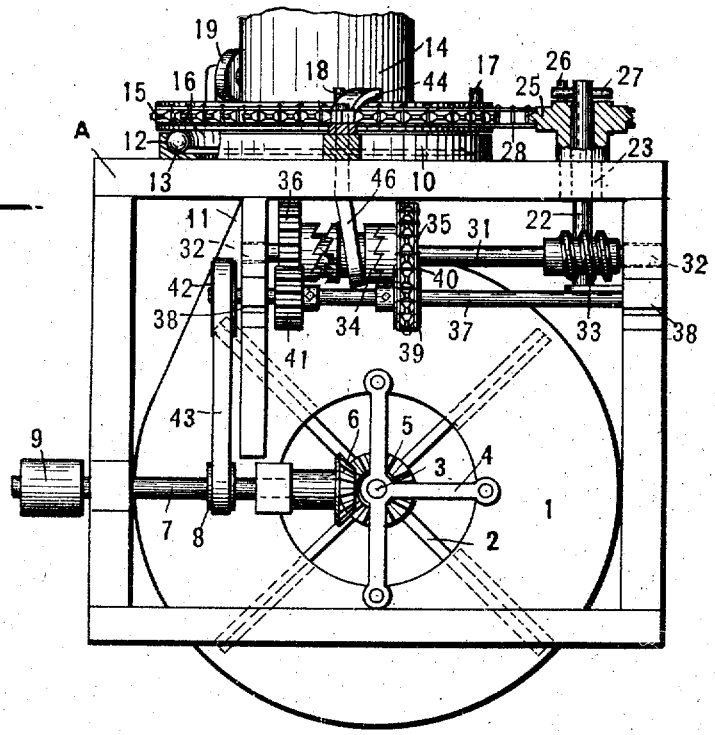
Figure 3:
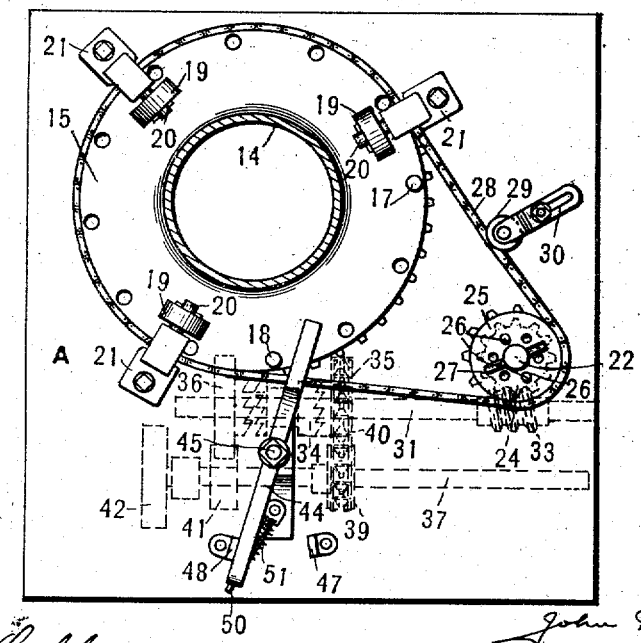

Figure 1 is a side elevation of a pneumatic straw-stacker constructed in accordance with my invention. Fig. 2 is a rear elevation of the same, partly in section, on line *a a* of Fig. 1. Fig. 3 is partly a horizontal section on line *b b* of Fig. 1, power and reversing mechanism being indicated in dotted lines. Figs. 4 and 5 are detail views.

Below the platform A, which projects from the casing B of a grain-separator or threshing-machine, is a fan casing or drum 1, in which is a revoluble blast-fan 2, which is mounted on a shaft 3, journaled in bearings 4 on the sides of the usual fan-casing, which receives the straw from the thresher. The said shaft 3 is provided at its outer end with a miter-gear 5, which is engaged by a similar gear 6 on the power-shaft 7. This main shaft carries pulleys 8 and 9, the latter being rotated by a belt (not shown) in the usual manner.

A circular base-plate 10 is bolted or otherwise mounted on the platform A above the fan-casing, and the latter has an upward-extending discharge-spout 11, which passes through a center opening in the said base-plate. An annular raceway 12 is formed in the upper side of the base-plate, and bearing-balls 13 are placed therein. The lower section of the stacker-tube 14 is secured to a rotatable table or master-gear 15, the latter having a central opening through which the spout 11 of fan-casing 1 extends. Master-gear 15 is provided on its lower side with a coacting raceway 16, disposed opposite the raceway 12, and engages the bearing-balls, the said master-gear being thereby adapted to rotate on the base-plate 10 and the friction between the master-gear and the base-plate being materially reduced. The master-gear is provided with peripheral sprocket-spurs, and projecting from its upper side are studs 17 18, which are disposed at a suitable angular distance apart. Antifriction-rollers 19 are journaled on spindles 20 of angle-brackets 21, which are bolted on the top of the platform A, the said antifriction-rollers engaging the upper side of the master-gear and holding the same to its seat on the balls 13. The master-gear forms the direct support and pivot for the stacker-tube, and it will be understood that by partly rotating the master-gear first in one direction and then in the reverse direction the stacker-tube may be oscillated or swung laterally, so as to appropriately discharge the straw, which is conveyed pneumatically therethrough by the blast from the blast-fan onto a stack or rick.

A vertical shaft 22 has its bearings, as at 23, in and below the platform A. A worm or other suitable gear-wheel 24 is fast on the lower portion of the said shaft, and a sprocket-pinion 25 is rotatably mounted on the upper end thereof. The sprocket-pinion is provided on its upper side with stop pins or studs 26, which are disposed opposite each other, and the shaft 22 carries a transversely-disposed pin 27, the projecting ends of which on opposite sides of the shaft 22 are adapted to engage the stop pins or studs 26 when the shaft 22 is rotated in either direction, whereby the said shaft is allowed a limited rotation independent of and before imparting rotary motion to the pinion 25. Pinion 25 instead of meshing directly with the master-gear 15 is connected thereto by a sprocket-chain 28, which is flexible in its plane of movement and is also somewhat flexible at right angles to its plane of movement, so that any variation in the original relative position of the axes of gear 15 and pinion 25 due to wear will not affect the operation of the chain. There can therefore be no binding or wearing of gear 15 even though its bearings finally allow a considerable displacement from its original plane of movement. An idle sheave 29, carried by an adjustable bracket 30 on the platform A, engages one lead of the endless sprocket-chain and may be so adjusted as to maintain the sprocket-chain in proper engagement with the gears.

A shaft 31 is journaled in suitable bearings 32 below platform A and carries a worm 33, which meshes with gear 24 of shaft 22. Splined upon shaft 31 is a clutch 34, which engages either a sprocket-gear 35 or a spur-gear 36, which are loose on said shaft 31. A counter-shaft 37 is arranged parallel with the shaft 31 in bearings 38. Secured to counter-shaft 37 is a sprocket-wheel 39, which is connected to the gear 35 by an endless sprocket-chain 40, and a spur-gear 41, which meshes with the gear 36. Counter-shaft 37 also carries a pulley 42, which is connected to the pulley 8 by an endless belt 43.

A shifting lever 44 is fulcrumed on the platform A, as at 45, and has a depending arm 46, the lower end of which is forked or bifurcated and engages the double-ended clutch 34. The inner arm of the said shifting lever projects over the master-gear 15 and is disposed between the studs 17 and 18. The outer arm of lever 44 operates between stops 47 and 48 and has a downwardly-extending ear or lug 49, through an opening in which extends an oscillating rod 50. A spring 51 on the said rod bears against the inner side of the lug or ear 49, and the tension of the said spring serves to keep the lever 44 to one end or the other of its swing.

The operation of my invention is as follows: The shaft 7 when the same is rotated drives the blast-fan, and the clutch 34 being in engagement either with the gear 35 or the gear 36 causes the shaft 31 to rotate in one direction and rotate the shaft 22 in one direction, the pinion 25 on said shaft 22, through the endless sprocket-chain 28, causing the master-gear to partly rotate in one direction, and thereby swing the stacker-tube to one side until one of the spurs or studs 17 18 by engagement with the shifting lever 44 moves the latter to the reverse position to that which it initially assumed. Clutch 34 is then shifted, and the direction of the shafts 31 and 32 is reversed in a manner common and well understood. As the shaft 22 changes the direction of its rotation the pin 27 leaves studs 26 of pinion 25 and shaft 22 is allowed approximately a half-revolution of independent movement before said pin comes again into driving contact with pins 26. The master-gear 15, to which pinion 25 is connected by chain 28, thus remains idle during a partial rotation of the shaft 22, thereby causing the stacker-tube to dwell at each limit of its path before reversing the direction of its movement. This dwelling of the stacker-tube allows the proper amount of straw to be deposited at the ends of the stack, and hence dispenses with the employment of one or more hands on the stack to appropriately dispose the straw thereon, as is now commonly required with machines of this type.

I claim as my invention—

1. In a pneumatic straw-stacker, the combination of a stacker-tube having a master-wheel forming the pivotal support thereof, a loose pinion to rotate said master-wheel, a shaft and coacting stops to rotate said pinion and permit of the partial rotation of said shaft independently of said pinion, a shaft and connections to rotate said pinion-shaft, shifting mechanism to rotate said shaft in opposite directions alternately, and a shifting lever actuated by stops carried by said master-wheel, whereby said stacker-tube may be automatically swung from side to side and caused to "dwell" at the limits of its path at each change in the direction of its movement, substantially as described.

2. In a pneumatic straw-stacker, the combination of a stacker-tube having a master-wheel forming the pivotal support thereof, said master-wheel having sprocket-teeth, a loose sprocket-pinion, an endless sprocket-chain connecting said master-wheel and sprocket-pinion, a shaft and coacting stops to rotate said pinion and permit of the partial rotation of said shaft and connections to rotate said pinion-shaft, shifting mechanism to rotate said shaft in opposite directions, alternately, and a shifting lever actuated by stops carried by said master-wheel, for the purpose set forth, substantially as described.

3. In a pneumatic stacker, the combination with the oscillatory discharge-tube thereof, of driving means therefor consisting in part of a gear, a shaft, a connection between said shaft and gear allowing a partial rotation of one independent of the other, and means for alternately driving one of said elements alternately in opposite directions.

4. In a pneumatic stacker, the combination with the oscillatory discharge-tube thereof, of driving-gear therefor consisting in part of a shaft, a gear mounted thereon, a pin carried by the shaft and a coacting pin carried by the gear in position to allow a relative rotation of the shaft or gear independent of the other, and means for automatically driving the independently-movable element alternately in opposite directions.

JOHN M. ANDREWS.

Witnesses:
A. J. HARDISON,
W. B. TURNER.